(12) United States Patent
Pan et al.

(10) Patent No.: US 12,077,306 B2
(45) Date of Patent: Sep. 3, 2024

(54) APPARATUS AND METHOD FOR OPTIMIZING MOTOR PERFORMANCE IN AN ELECTRIC AIRCRAFT

(71) Applicant: BETA AIR LLC, South Burlington, VT (US)

(72) Inventors: Zach Pan, Cary, NC (US); Chris Woodalll, Burlington, VT (US); Jeffrey K Petter, Williston, VT (US)

(73) Assignee: BETA AIR LLC, South Burlington, VT (US)

( * ) Notice: Subject to any disclaimer, the term of this patent is extended or adjusted under 35 U.S.C. 154(b) by 0 days.

(21) Appl. No.: 17/852,905

(22) Filed: Jun. 29, 2022

(65) Prior Publication Data
US 2024/0002061 A1   Jan. 4, 2024

(51) Int. Cl.
*B64D 27/24*   (2024.01)
*B64C 29/00*   (2006.01)
*B64D 31/06*   (2024.01)

(52) U.S. Cl.
CPC ............. *B64D 27/24* (2013.01); *B64D 31/06* (2013.01); *B64C 29/0025* (2013.01)

(58) Field of Classification Search
CPC ...... B64D 27/24; B64D 31/06; B64C 29/0025
See application file for complete search history.

(56) References Cited

U.S. PATENT DOCUMENTS

| | | | |
|---|---|---|---|
| 4,590,413 A | 5/1986 | Gritter et al. | |
| 9,007,005 B2 | 4/2015 | Sung et al. | |
| 9,036,371 B2 | 5/2015 | Baarman | |
| 9,479,095 B2 | 10/2016 | Sankaran | |
| 10,027,262 B2 | 7/2018 | Wolf et al. | |
| 10,259,340 B1 | 4/2019 | Wolf et al. | |
| 10,407,178 B2* | 9/2019 | Regev | B64D 27/24 |
| 10,500,965 B2 | 12/2019 | Wang et al. | |
| 10,686,385 B2 | 6/2020 | Brown et al. | |
| 11,040,632 B2 | 6/2021 | Ge et al. | |
| 11,267,574 B2* | 3/2022 | Benson | B64D 27/24 |
| 11,383,850 B2* | 7/2022 | Verna | H02K 9/06 |
| 11,509,256 B2* | 11/2022 | Das | H02P 29/032 |

(Continued)

FOREIGN PATENT DOCUMENTS

WO   2008079148   7/2008

OTHER PUBLICATIONS

Aalborg University, ZH, Jul. 10, 2014, Zhao, Xin; Guerrero, Josep M.; Wu, Xiaohao, Abstract; p. 3; p. 5.

(Continued)

*Primary Examiner* — Tyler J Lee
(74) *Attorney, Agent, or Firm* — Brake Hughes Bellermann LLP

(57) ABSTRACT

In an aspect, this disclosure is related to apparatus and method for optimizing motor performance in an electric vertical takeoff and landing aircraft. Apparatus includes a motor, an inverter, a sensor, and a flight controller. Flight controller is configured to receive an operational datum from a sensor, which detects a physical phenomenon and generates an operational datum. Flight controller is configured to generate an optimized switching frequency for the inverter based on the operational datum. Flight controller is configured to adjust the switching frequency of the inverter based on the optimized switching frequency.

20 Claims, 7 Drawing Sheets

(56) References Cited

U.S. PATENT DOCUMENTS

| | | | |
|---|---|---|---|
| 2016/0077142 A1 | 3/2016 | Kanayama et al. | |
| 2017/0217600 A1* | 8/2017 | Regev | B64D 35/02 |
| 2018/0369864 A1* | 12/2018 | Lei | G01N 29/225 |
| 2019/0296680 A1* | 9/2019 | Das | H02P 29/50 |
| 2020/0328714 A1 | 10/2020 | Tripathi | |
| 2020/0385130 A1* | 12/2020 | Verna | H02K 5/1735 |
| 2020/0385139 A1* | 12/2020 | Verna | H02K 7/085 |
| 2022/0003863 A1* | 1/2022 | Habib | G06V 20/58 |

OTHER PUBLICATIONS

Marian Blachuta, Robert Bieda and Rafal Grygiel, Sampling Rate and Performance of DC/AC Inverters with Digital PID Control—A Case Study, Sep. 21, 2021.

\* cited by examiner

APPARATUS AND METHOD FOR OPTIMIZING MOTOR PERFORMANCE IN AN ELECTRIC AIRCRAFT

FIELD OF THE INVENTION

The present invention generally relates to the field of electric aircrafts. In particular, the present invention is directed to an apparatus and method for optimizing motor performance in an electric vertical takeoff and landing aircraft.

BACKGROUND

Electric aircrafts have seen impressive advancement in the recent years. However, one of the limitations of electric air travel is battery charge and battery life. There is a need to efficiently draw power from batteries to develop longer flying electric aircrafts.

SUMMARY OF THE DISCLOSURE

In an aspect an apparatus for optimizing motor performance in an electric vertical takeoff and landing aircraft includes: a motor, an inverter electronically connected to the motor, wherein the inverter is configured to: accept a direct current, and produce an alternating current as a function of a switching frequency, a sensor configured to detect a physical phenomenon and generate an operational datum, at least a controller, and a memory communicatively connected to the controller, the memory containing instructions configuring the at least a controller to: receive an operational datum from the sensor, generate an optimized switching frequency for the inverter as a function of the operational datum, and adjust a switching frequency of the inverter based on the optimized switching frequency.

In another aspect a method for optimizing motor performance in an electric vertical takeoff and landing aircraft includes: accepting, by inverter, a direct current, producing, by inverter, an alternating current as a function of a switching frequency, detecting, by sensor, a physical phenomenon, generating, by sensor, an operational datum, receiving, by controller, an operational datum, generating, by controller, an optimized switching frequency for an inverter as a function of the operational datum, and adjusting, by controller, switching frequency of the inverter based on the optimized switching frequency.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for optimizing motor performance in an electric vertical takeoff and landing aircraft. In an embodiment, motor includes an inverter 208 configured to turn DC current into AC current. The frequency that the inverter 208 alternates the current dictates the power loss on the motor. Optimizing the switching frequency may optimize motor efficiency. Exemplary embodiments illustrating aspects of the present disclosure are described below in the context of several specific examples.

Figure 1:
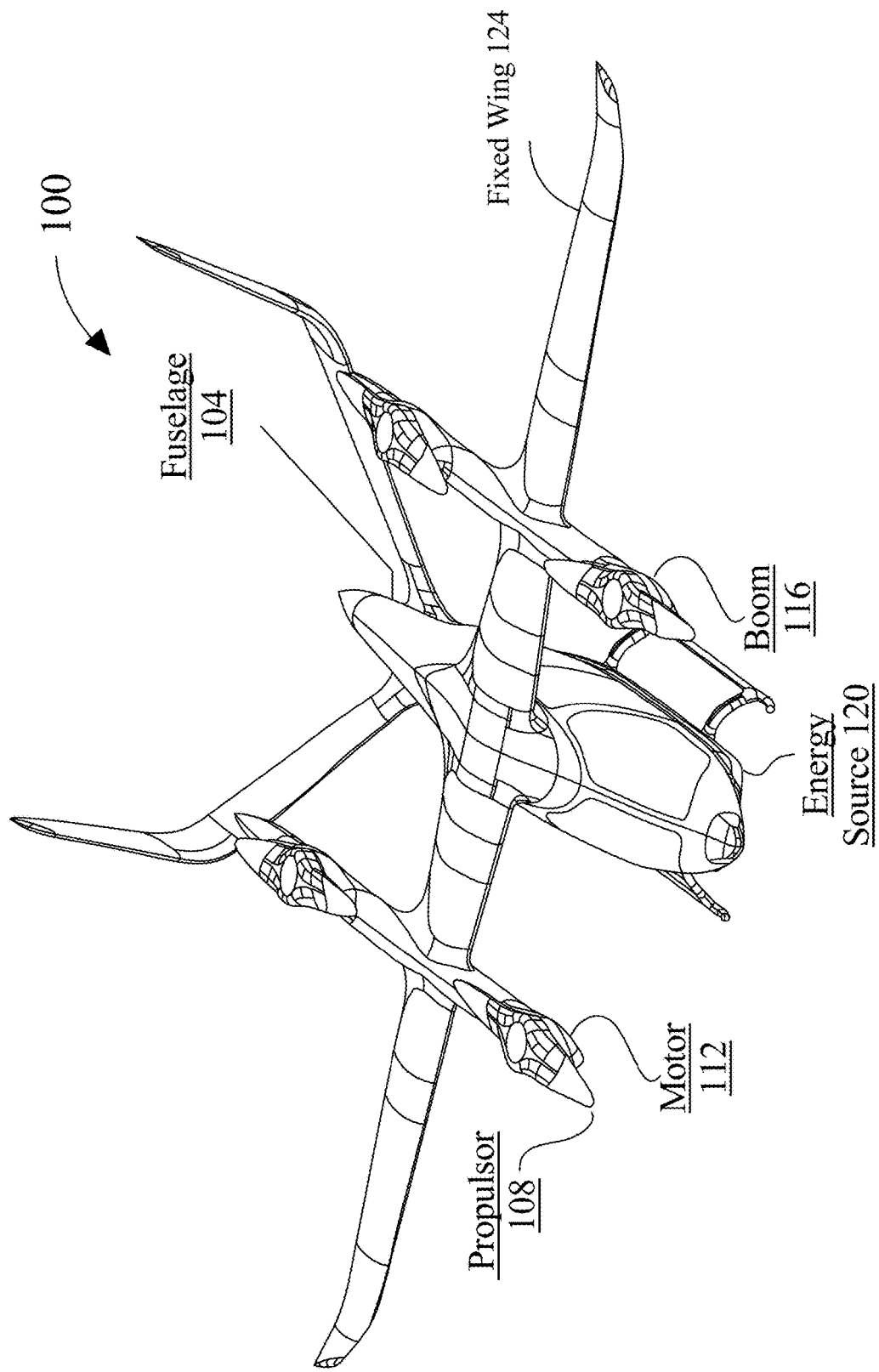
FIG. 1 is an exemplary embodiment of an electric aircraft.

Referring now to FIG. 1, an exemplary embodiment of an electric aircraft 100 is shown, also referred to herein as 'aircraft'. In some embodiments, aircraft 100 may be an electric vertical takeoff and landing aircraft (eVTOL). Aircraft 100 includes a motor 112, an inverter electronically connected to the motor, a flight controller, and a sensor communicatively connected the flight controller. As used in this disclosure, a vertical take-off and landing (VTOL) aircraft is an aircraft that can hover, take off, and land vertically. An eVTOL, as used in this disclosure, is an electrically powered aircraft typically using an energy source, of a plurality of energy sources to power aircraft. To optimize the power and energy necessary to propel aircraft 100, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad-copter," multi-rotor helicopter, or other vehicle that maintains its lift primarily using downward thrusting propulsors. "Fixed-wing flight", as described herein, is where the aircraft is capable of flight using wings and/or foils that generate lift caused by the aircraft's forward airspeed and the shape of the wings and/or foils, such as airplane-style flight. In an embodiment, and without limitation, aircraft may be configured with an electric propulsion assembly. Electric propulsion assembly may include any electric propulsion assembly as described in U.S. Nonprovisional application Ser. No. 16/603,225, filed on Dec. 4, 2019, and entitled "AN INTEGRATED ELECTRIC PROPULSION ASSEMBLY," the entirety of which is incorporated herein by reference.

With continued reference to FIG. 1, aircraft 100 may include a fuselage. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 104 may comprise structural elements that physically support the shape and structure of an aircraft. Structural elements may take a plurality of forms, alone or in combination with other types. Structural elements may vary depending on the construction type of aircraft and specifically, the fuselage. Fuselage 104 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

In embodiments, and with continued reference to FIG. 1, aircraft fuselage 104 may include and/or be constructed using geodesic construction. Geodesic structural elements may include stringers wound about formers (which may be alternatively called station frames) in opposing spiral directions. A "stringer," as used in this disclosure, is a general structural element that may include a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 104 orthogonal to a longitudinal (nose to tail) axis of the aircraft and may form a general shape of fuselage 104. A former may include differing cross-sectional shapes at differing locations along fuselage 104, as the former is the structural element that informs the overall shape of a fuselage 104 curvature. In embodiments, aircraft skin may be anchored to formers and strings such that the outer mold line of a volume encapsulated by formers and stringers includes the same shape as aircraft 100 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be attached to underlying stringers and formers and may interact with a fluid, such as air, to generate lift and perform maneuvers.

In an embodiment, and still referring to FIG. 1, fuselage 104 may include and/or be constructed using monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may include aircraft skin made from plywood layered in varying grain directions, epoxy-impregnated fiberglass, carbon fiber, or any combination thereof.

According to embodiments, and further referring to FIG. 1, fuselage 104 may include a semi-monocoque construction. Semi-monocoque construction, as used herein, is a partial monocoque construction, wherein a monocoque construction is describe above detail. In semi-monocoque construction, aircraft fuselage 104 may derive some structural support from stressed aircraft skin and some structural support from underlying frame structure made of structural elements. Formers or station frames can be seen running transverse to the long axis of fuselage 104 with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction," vehicles are characterized by a construction in which the body, floor plan, and chassis form a single structure. In the aircraft world, unibody may be characterized by internal structural elements like formers and stringers being constructed in one piece, integral to the aircraft skin as well as any floor construction like a deck.

Still referring to FIG. 1, stringers, and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may include aluminum, aluminum alloys, graphite epoxy composite, steel alloys, titanium, or an undisclosed material alone or in combination.

In an embodiment, and still referring to FIG. 1, stressed skin, when used in semi-monocoque construction is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of fuselage 104. Monocoque includes only structural skin, and in that sense, aircraft skin undergoes stress by applied aerodynamic fluids imparted by the fluid. Stress as used in continuum mechanics may be described in pound-force per square inch (lbf/in2) or Pascals (Pa). In semi-monocoque construction stressed skin may bear part of aerodynamic loads and additionally may impart force on an underlying structure of stringers and formers.

In an embodiment, and still referring to FIG. 1, a fixed wing 124 may be mechanically attached to fuselage 104.

Fixed wings may be structures which include airfoils configured to create a pressure differential resulting in lift. Fixed wings may generally dispose on the left and right sides of the aircraft symmetrically, at a point between nose and empennage. Fixed wings may comprise a plurality of geometries in planform view, swept swing, tapered, variable wing, triangular, oblong, elliptical, square, among others. A wing's cross section may geometry comprises an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. In an embodiment, and without limitation, wing may include a leading edge. As used in this disclosure a "leading edge" is a foremost edge of an airfoil that first intersects with the external medium. For example, and without limitation, leading edge may include one or more edges that may comprise one or more characteristics such as sweep, radius and/or stagnation point, droop, thermal effects, and the like thereof. In an embodiment, and without limitation, wing may include a trailing edge. As used in this disclosure a "trailing edge" is a rear edge of an airfoil. In an embodiment, and without limitation, trailing edge may include an edge capable of controlling the direction of the departing medium from the wing, such that a controlling force is exerted on the aircraft. Boom 116 may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Boom may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

Still referring to FIG. 1, aircraft 100 comprises an electric vertical takeoff and landing aircraft. As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate lift caused by the aircraft's forward airspeed and the shape of the wings and/or foils, such as airplane-style flight. Boom 116 is located on aircraft 100, attached and adjacent to the fuselage 104. As used in this disclosure, a "boom" is an element that projects essentially horizontally from fuselage, including a laterally extending element, an outrigger, a spar, a lifting body, and/or a fixed wing that extends from fuselage 104. For the purposes of this disclosure, a "lifting body" is a structure that creates lift using aerodynamics. Boom 116 may extend perpendicularly to the fuselage 104. Aircraft 100 comprises at least one motor assembly and at least one boom to house said motor assembly. Motor assembly may be comprised of an electric, gas, etc. motor. Motor 112 is driven by electric power wherein power have varying or reversing voltage levels. For example, motor 112 may be driven by alternating current (AC) wherein power is produced by an alternating current generator or inverter 208. A propulsor may be attached to a motor assembly. Propulsor 108 is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components. Pusher component may be mounted on the back of the fuselage.

In another embodiment, and still referring to FIG. 1, propulsor 108 may include a propeller, a blade, or any combination of the two. A propeller may function to convert rotary motion from an engine or other power source into a swirling slipstream which may push the propeller forwards or backwards. Propulsor 108 may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

Still referring to FIG. 1, propulsor 108 may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

Still referring to FIG. 1, Aircraft 100 may be included of a driveshaft that is mechanically affixed to the propulsor 108. As used in the current disclosure, a "driveshaft" is a component for transmitting mechanical power, torque, and rotation. In an embodiment, a driveshaft maybe configured to is to couple to the motor 112 that produces the power to the propulsor that uses this mechanical power to rotate the propellors. This connection involves mechanically linking the two components. In a nonlimiting example, the driveshaft may be used to transfer torque between components that are separated by a distance, since different components must be in different locations in the aircraft. To allow for variations in the alignment and distance between the propulsor and the motor 112, driveshafts frequently incorporate one or more universal joints, jaw couplings, or rag joints, and sometimes a splined joint or prismatic joint.

Additional disclosure related to an electric motor or a propulsor may be found in U.S. patent application Ser. No. 17/564,404, filed on Dec. 29, 2021, and entitled "SYSTEM FOR A VERTICAL TAKEOFF AND LANDING AIRCRAFT WITH AN IN-BOOM LIFT PROPULSOR," the entirety of which is incorporated herein by reference.

Still referring to FIG. 1, aircraft 100 includes a plurality of electric motors 112. In some embodiments, aircraft 100 may include two electric motors 112; for example, first electric motor and second electric motor in FIG. 1. In some embodiments, aircraft 100 may include more than two of electric motor 112. For the purposes of this disclosure, an "electric motor," is a machine that converts electrical energy into mechanical energy. Each electric motor 112 in aircraft 100 includes a stator and at least an inverter 208. The plurality of electric motors 112 are discussed in more detail below.

With continued reference to FIG. 1, aircraft 100 may include a motor nacelle. Motor nacelle surrounds the at least an electric motor. In an embodiment, as in FIG. 1, motor nacelle may surround first electric motor 112 and second electric motor 112. For the purposes of this disclosure, "motor nacelle" refers to a streamlined enclosure that houses an aircraft motor. In some embodiments, motor nacelle may be located on the wing or boom of an aircraft. In some other embodiments, motor nacelle may be part of an aircraft tail cone. A "tail cone," for the purposes of this disclosure, refers to the conical section at the tail end of an aircraft. Tail cone may house a motor attached to the pusher component and/or propulsor.

Still referring to FIG. 1, propulsor 108 may include any such components and related devices as disclosed in U.S. Nonprovisional application Ser. No. 16/910,255, filed on Jun. 24, 2020, entitled "AN INTEGRATED ELECTRIC PROPULSION ASSEMBLY,"U.S. Nonprovisional application Ser. No. 17/001,845, filed on Aug. 25, 2020, entitled "A HOVER AND THRUST CONTROL ASSEMBLY FOR DUAL-MODE AIRCRAFT," U.S. Nonprovisional application Ser. No. 17/186,079, filed on Feb. 26, 2021, entitled "METHODS AND SYSTEM FOR ESTIMATING PERCENTAGE TORQUE PRODUCED BY A PROPULSOR CONFIGURED FOR USE IN AN ELECTRIC AIRCRAFT," the entirety of each one of which is incorporated herein by reference. Any aircrafts, including electric and eVTOL aircrafts, as disclosed in any of these applications may efficaciously be utilized with any of the embodiments as disclosed herein, as needed, or desired. Any flight controllers as disclosed in any of these applications may efficaciously be utilized with any of the embodiments as disclosed herein, as needed, or desired.

Figure 2:
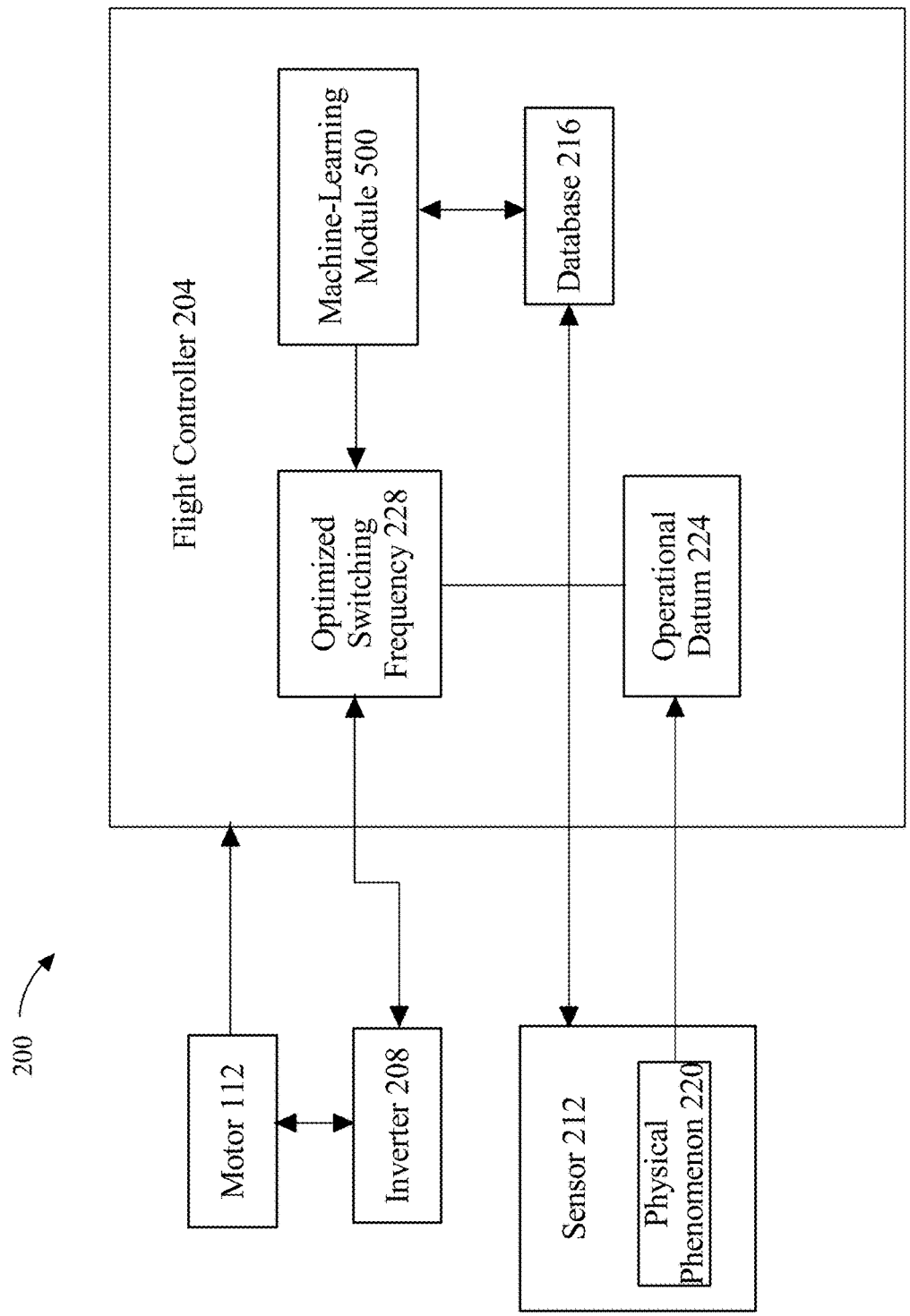
FIG. 2 is a block diagram of an apparatus for optimizing motor performance.

Referring now to FIG. 2, an exemplary embodiment of an apparatus 200 for optimizing motor performance in an electric aircraft is illustrated. Apparatus 200 includes a controller. The controller may be a flight controller 204. Flight controller 204 may include any computing device as described in this disclosure, including without limitation, a microcontroller, a microprocessor, a digital signal processor (DSP) and/or a system on a chip (SoC) as described in this disclosure. Computing devices may include, be included in, and/or communicate with a mobile device such as a mobile telephone or smartphone. Flight controller 204 may include a single computing device operating independently, or may include two or more computing devices operating in concert, in parallel, sequentially, or the like; two or more computing devices may be included together in a single computing device or in two or more computing devices. Flight controller 204 may interface or communicate with one or more additional devices as described below in further detail via a network interface device. Network interface device may be utilized for connecting flight controller 204 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Flight controller 204 may include but is not limited to, for example, a computing device or cluster of computing devices in a first location and a second computing device or cluster of computing devices in a second location. Flight controller 204 may include one or more computing devices dedicated to data storage, security, distribution of traffic for load balancing, and the like. Flight controller 204 may distribute one or more computing tasks as described below across a plurality of computing devices, which may operate in parallel, in series, redundantly, or in any other manner used for distribution of tasks or memory between computing devices. Flight controller 204 may be implemented using a "shared nothing" architecture in which data is cached at the worker. In an embodiment, this may enable scalability of aircraft 100 and/or the computing device(s).

With continued reference to FIG. 2, flight controller 204 may be designed and/or configured to perform any method, method step, or sequence of method steps in any embodiment described in this disclosure, in any order and with any degree of repetition. For instance, flight controller 204 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. flight controller 204 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to refer to FIG. 2, apparatus 200 includes electronic motor 112. Motor 112 may be configured to drive a propulsion component of the aircraft 100. A propulsion component may include any component that is configured to provide vertical thrust (e.g. lift) and/or horizontal thrust (e.g. forward thrust) to the aircraft 100. In an embodiment, a propulsion component may include a propulsor, rotor, propeller, blade, combinations thereof, and the like. A motor 112 may be driven by direct current (DC) electric power and may include, without limitation, brushless DC electric motors, switched reluctance motors, induction motors, or any combination thereof. Alternatively or additionally, a motor may be driven by an inverter 208. A motor 112 may also include electronic speed controllers, inverters, or other components for regulating motor speed, rotation direction, and/or dynamic braking. Aircraft 100 may include a plurality of motors. Aircraft 100 may include a dual motor assembly. A "dual motor assembly", as used herein, is a motor assembly that includes two motors. The dual motor assembly is a redundancy configured to safeguard from potential failure of the first motor. In a dual motor configuration, both motors may be attached to and/or drive one propulsor component. Additional disclosure related to motor assemblies and electric propulsion assemblies can be found in U.S. patent application Ser. No. 16/910,255, filed on Jun. 24, 2021, and entitled "INTEGRATED ELECTRIC PROPULSION ASSEMBLY," the entirety of which is incorporated herein by reference. Additional disclosure related to the rotors, or an electric aircraft can be found in U.S. patent application Ser. No. 17/704,798, filed on Mar. 25, 2022, and entitled "ROTOR FOR AN ELECTRIC AIRCRAFT MOTOR," the entirety of which is incorporated herein by reference. Additional disclosure related to motor windings can be found in U.S. patent application Ser. No. 17/154,578, filed on Jan. 1, 2021, and entitled "METHODS AND SYSTEMS FOR A STATOR WITH HELICAL WINDINGS CONFIGURED FOR USE IN ELECTRIC AIRCRAFT MOTOR," the entirety of which is incorporated herein by reference.

Still referring to FIG. 2, apparatus 200 includes an inverter 208 electronically connected to the motor 112. In some embodiments, inverter 208 may be a component of motor 112. Inverter 208 is configured to accept a direct current and produce an alternating current. An "inverter," as used in this this disclosure, is a power electronic device or circuitry that changes direct current (DC) to alternating current (AC). An inverter (also called a power inverter) may be entirely electronic or may include at least a mechanism (such as a rotary apparatus) and electronic circuitry. In some embodiments, static inverters may not use moving parts in conversion process. Inverters may not produce any power itself; rather, inverters may convert power produced by a DC power source. Inverters may often be used in electrical power applications where high currents and voltages are present; circuits that perform a similar function, as inverters, for electronic signals, having relatively low currents and potentials, may be referred to as oscillators. In some cases, circuits that perform opposite function to an inverter, converting AC to DC, may be referred to as rectifiers. Further description related to inverters and their use with electrical motors used on electric VTOL aircraft is disclosed within U.S. patent application Ser. No. 17/144,304 entitled "METHODS AND SYSTEMS FOR A FRACTIONAL CONCENTRATED STATOR CONFIGURED FOR USE IN ELECTRIC AIRCRAFT MOTOR" filed on Jan. 8, 2021 and by C. Lin et al. Additional descriptions related to inverters and electrical motors are disclosed in U.S. patent application Ser. No. 17/197,427 entitled "SYSTEM AND METHOD FOR FLIGHT CONTROL IN ELECTRIC AIRCRAFT" by T. Richter et al. and filed on Mar. 10, 2021. Inverter 208 is configured to accept direct current and produce alternating current. As used in this disclosure, "alternating current" is a flow of electric charge that periodically reverses direction. In some cases, an alternating current may continuously change magnitude overtime; this is in contrast to what may be called a pulsed direct current. Alternatively or additionally, in some cases an alternating current may not continuously vary with time, but instead exhibit a less smooth temporal form. For example, exemplary non-limiting AC waveforms may include a square wave, a triangular wave (i.e., sawtooth), a modifier sine wave, a pulsed sine wave, a pulse width modulated wave, and/or a sine wave. As a further non-limiting example, inverter 208 may include receiving a first input voltage and outputting a second voltage, wherein the second voltage is different from the first voltage.

In an embodiment, and still referring to FIG. 2, inverter 208 may draw direct current from a power source. As used in this disclosure a "power source" is a source that that drives and/or controls any other flight component. For example, and without limitation power source may include an inverter that powers a motor 112 that operates to move one or more lift propulsor components, to drive one or more blades, or the like thereof. A motor 112 may be driven by direct current (DC) electric power from an inverter and may include, without limitation, brushless DC electric motors, switched reluctance motors, induction motors, or any combination thereof. A motor 112 may also include electronic speed controllers or other components for regulating motor speed, rotation direction, and/or dynamic braking.

Still referring to FIG. 1, power source may include an energy source 120. An energy source 120 may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source 120 may also include a battery cell, or a plurality of battery cells connected in series into a pack and each pack connected in series or in parallel with other packs. Configuration of an energy source 120 containing connected packs may be designed to meet an energy or power requirement and may be designed to fit within a designated footprint in an electric aircraft in which aircraft 100 may be incorporated. Energy source 120 may be located as a pack at the bottom of the aircraft 100.

In an embodiment, and still referring to FIG. 1, an energy source 120 may be used to provide a steady supply of electrical power to a load over the course of a flight by a vehicle or other electric aircraft. For example, the energy source 120 may be capable of providing sufficient power for "cruising" and other relatively low-energy phases of flight. An energy source 120 may also be capable of providing electrical power for some higher-power phases of flight as well, particularly when the energy source 120 is at a high state of charge, as may be the case for instance during takeoff. In an embodiment, the energy source 120 may be capable of providing sufficient electrical power for auxiliary loads including without limitation, lighting, navigation, communications, de-icing, steering or other systems requiring power or energy. Further, the energy source 120 may be capable of providing sufficient power for controlled descent and landing protocols, including, without limitation, hovering descent or runway landing. As used herein the energy source 120 may have high power density where the electrical power an energy source 120 can usefully produce per unit of volume and/or mass is relatively high. The electrical power is defined as the rate of electrical energy per unit time. An energy source 120 may include a device for which power that may be produced per unit of volume and/or mass has been optimized, at the expense of the maximal total specific energy density or power capacity, during design. Non-limiting examples of items that may be used as at least an energy source 120 may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source 120 may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source 120.

Continuing to reference FIG. 2, apparatus 200 includes a sensor 212 configured to detect a physical phenomenon 220 and generate an operational datum 224. In one or more embodiments, apparatus 200 may include a sensor array, which may include a plurality of sensors. In one or more embodiments, each sensor 212 of sensor array may be configured to detect a physical phenomenon 220, such as a characteristic or event. More specifically, each sensor 212 of sensor array may detect the same physical phenomenon 220. Each sensor 212 may detect a different physical phenomenon 220. For the purposes of this disclosure, a "physical phenomenon" is a sensor measurement related to a parameter of a physical characteristic and/or event. For instance, and without limitation, sensor 212 may detect external conditions of the aircraft 100. In an embodiment, sensor 212 may detect environmental phenomenon, such as weather. In another instance, sensor 212 may detect a physical state or an electrical characteristic of an electric vehicle and/or a component thereof, such as a power source. In an exemplary embodiments, a state of a battery pack of an electric vehicle may be detected by sensor array. A state of a battery pack may include detectable information related to, for example, a state of charge (SOC), depth of discharge (DOD), temperature, a moisture level, a humidity, a voltage, a current, vent gas, vibrations, chemical content, or other measurable phenomenon of the battery pack and/or components thereof, such as a battery module and/or a battery cell.

As used in this disclosure, a "sensor" is a device that is configured to detect a phenomenon and transmit information and/or datum related to the detection of the phenomenon. Sensor 212 may include temperature sensors, thermocouples, humidity, current, voltage, resistance, and the like. For example, and without limitation, a sensor may transduce a detected phenomenon, such as without limitation, temperature, voltage, current, pressure, and the like, into a sensed signal. In one or more embodiments, and without limitation, sensor 212 may include one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, and the like. Sensor 212 may generate and transmit an operational datum 224 based on the physical phenomenon 220. For instance, and without limitation, a sensor 212 may transform an electrical and/or nonelectrical stimulation into an electrical signal that is suitable to be processed by an electrical circuit, such as a controller. A sensor 212 may generate a sensor output signal, which transmits information and/or datum related to a detection by the sensor 212. A sensor output signal may include any signal form described in this disclosure, such as for example, digital, analog, optical, electrical, fluidic, and the like. In some cases, a sensor 212, a circuit, and/or a controller may perform one or more signal processing steps on a signal. For instance, a sensor 212, circuit, and/or controller may analyze, modify, and/or synthesize a signal in order to improve the signal, for instance by improving transmission, storage efficiency, or signal to noise ratio.

In one or more embodiments, apparatus 200 may include a plurality of sensor arrays, where each sensor array includes a plurality of sensors configured to detect a specific physical characteristic. For example, and without limitation, each sensor 212 of a first sensor array may be configured to detect a first physical phenomenon 220, such as a humidity level of a battery pack of an electric aircraft, while each sensor 212 of a second sensor array may be configured to detect a second physical phenomenon 220, such as an altitude of the electric vehicle during operation, such as flight. One of ordinary skill in the art would understand that the terms "first" and "second" do not refer to either sensor array as primary or secondary. In non-limiting embodiments, the first and second arrays, due to their physical isolation, may be configured to withstand malfunctions or failures in the other system and survive and operate. In one or more embodiments, the plurality of sensors may be located within a close proximity to each other. In other embodiments, each sensor 212 may be remote to the other sensors of sensor array. For example, each sensor 212 may be positioned in a different location from the other sensors of sensor array. Positioning sensors remotely from each other holds a benefit of avoiding the same environmental error affecting all the sensors of the sensory array. For example, and without limitation, if one sensor is short circuiting due to contacting a hot wire, the other sensors will not be affected by the malfunctioning sensor.

In one or more embodiments, sensors of sensor array may be physically isolated from each other. "Physical isolation", for the purposes of this disclosure, refers to a first system's components, communicative connection, and/or any other constituent parts, whether software or hardware, are separated from a second system's components, communicative connection, and any other constituent parts, whether software or hardware, respectively. In one or more embodiments, each sensor 212 may perform the same function and measure the same physical phenomenon 220 as the other sensors of sensor array. Each sensor 212 of sensor array may be the same type of sensor as the other sensors of sensor array or each sensor 212 may be a different type of sensor that measures the same physical phenomenon 220 as the other sensors of sensor array. For example, and without limitation, each sensor 212 of a sensor array may include a thermometer. In another embodiment, sensors of a sensor array may include a thermometer, thermistor, infrared sensor, and the like.

Still referring to FIG. 2, sensors may be electrically isolated from each other. "Electrical isolation", for the purposes of this disclosure, refers to a first system's separation of components carrying electrical signals or electrical energy from a second system's components. Thus, if one sensor of sensor array malfunctions or suffers an electrical catastrophe, rendering it inoperable or inaccurate, due to electrical isolation, the other sensors may still continue to operate and function normally, allowing for continued detection of physical phenomenon 220 of the electric vehicle and/or components thereof. Shielding structural components, material selection, a combination thereof, or another undisclosed method of electrical isolation and insulation may be used in non-limiting embodiments. For example, and without limitation, a rubber or other electrically insulating material component may be disposed between electrical components of each sensor 212, preventing electrical energy to be conducted through it, isolating each sensor 212 from each other.

Still referring to FIG. 2, each sensor 212 of sensor array is configured to transmit an operational datum 224 related to the detected physical phenomenon 220. In one or more embodiments, each sensor 212 may generate a sensor output signal that includes information and/or datum related to the detected event and/or phenomenon, such as, for example, operational datum 224 of the sensors. For the purposes of this disclosure, "operational datum" is an electronic signal representing information and/or datum of a detected physical phenomenon 220 associated with an aircraft. For example, and without limitation, operational datum 224 may include data regarding a detected temperature of a battery cell. In another example, and without limitation, operational datum 224 may include data of an environmental condition, such as wind forces experienced by an aircraft 100 during flight. In one or more embodiments, operational datum 224 may include a state of charge (SOC) of a battery pack of aircraft 100, a depth of discharge (DOD) of a battery pack of aircraft 100, a temperature reading of one or more components of aircraft 100, a moisture/humidity level of a component of aircraft 100 and/or of an environment surrounding aircraft 100, a gas level of a battery pack of aircraft 100, a chemical level of a battery pack of aircraft 100, a voltage of a component of the aircraft 100, a current of a component of aircraft 100, a pressure of a component of aircraft 100 and/or of an environment of aircraft 100, and the like.

Continuing to reference FIG. 2, operational datum 224 may include a datum as a function of a user command. In an embodiment, sensor 212 may be configured to detect a user command, such as through the use of pilot control. Sensor 212 may be mechanically and/or communicatively coupled to a pilot control. Pilot control may include, without limitation, a hover control, a thrust control, an inceptor stick, a cyclic, and/or a collective control. As used in this disclosure a "collective control" or "collective" is a mechanical control of an aircraft that allows a pilot to adjust and/or control the pitch angle of the plurality of actuators. For example and without limitation, collective control may alter and/or adjust the pitch angle of all of the main rotor blades collectively. For example, and without limitation pilot control may include a yoke control. As used in this disclosure a "yoke control" is a mechanical control of an aircraft to control the pitch and/or roll. For example and without limitation, yoke control may alter and/or adjust the roll angle of aircraft as a function of controlling and/or maneuvering ailerons. In an embodiment, pilot control may include one or more footbrakes, control sticks, pedals, throttle levels, and the like thereof. In another embodiment, and without limitation, pilot control may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft 100 to the right. Principal axis may include a pitch axis. As used in this disclosure a "pitch axis" is an axis that is directed towards the right laterally extending wing of the aircraft 100. For example, and without limitation, a positive pitching motion may include adjusting and/or shifting the nose of aircraft upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

Still referring to FIG. 2, pilot control may be configured to modify a variable pitch angle. For example, and without limitation, pilot control may adjust one or more angles of attack of a propeller. As used in this disclosure an "angle of attack" is an angle between the chord of the propeller and the relative wind. For example, and without limitation, angle of attack may include a propeller blade angled 3.2°. In an embodiment, pilot control may modify the variable pitch angle from a first angle of 2.71° to a second angle of 3.82°. Additionally or alternatively, pilot control may be configured to translate a pilot desired torque for flight component. For example, and without limitation, pilot control may translate that a pilot's desired torque for a propeller be 160 lb. ft. of torque. As a further non-limiting example, pilot control may introduce a pilot's desired torque for a propulsor to be 290 lb. ft. of torque. Additional disclosure related to pilot control may be found in U.S. patent application Ser. Nos. 17/001,845 and 16/929,206 both of which are entitled "A HOVER AND THRUST CONTROL ASSEMBLY FOR DUAL-MODE AIRCRAFT" by C. Spiegel et al., which are incorporated in their entirety herein by reference.

Still referring to FIG. 2, in some embodiments, sensor 212 may be configured to sense a phenomenon associated with any pilot control described in this disclosure. Non-limiting examples of a sensor may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 212 may sense a characteristic as an analog measurement, for instance, yielding a continuously variable electrical potential indicative of the sensed characteristic. In these cases, sensor 212 may additionally comprise an analog to digital converter (ADC) as well as any additional circuitry, such as, without limitation, a Wheatstone bridge, an amplifier, a filter, and the like. For instance, in some cases, sensor 212 may comprise a strain gauge configured to determine loading of one or flight components, for instance, landing gear. A strain gauge may be included within a circuit comprising a Wheatstone bridge, an amplifier, and a bandpass filter to provide an analog strain measurement signal having a high signal to noise ratio, which characterizes strain on a landing gear member. An ADC may then digitize the analog signal, producing a digital signal that can then be transmitted to other systems within aircraft 100, for instance, without limitation, a computing system, a pilot display, and a memory component. Alternatively or additionally, sensor 212 may sense a characteristic of a pilot control digitally. For instance in some embodiments, sensor 212 may sense a characteristic through a digital means or digitize a sensed signal natively. In some cases, for example, sensor 212 may include a rotational encoder and be configured to sense a rotational position of a pilot control; in this case, the rotational encoder digitally may sense rotational "clicks" by any known method, such as, without limitation, magnetically, optically, and the like. As used in the current disclosure, an "encoder" is an electro-mechanical device that converts the angular position or motion of a shaft or axle to an analog or digital output signal. There are two main types of rotary encoders, absolute and incremental. For example, the output of an absolute encoder indicates the current shaft position, making it an angle transducer. For example, the output of an incremental encoder provides information about the motion of the shaft, which typically is processed elsewhere into information such as position, speed, and distance. Encoders may be used in applications that require monitoring or control, or both, of mechanical systems.

Continuing to refer to FIG. 2, in an embodiment, sensor 212 may be configured to generate an operational datum 224 including state of charge (SoC). For the purposes of this disclosure, "state of charge" is the level of charge of an electric battery relative to its capacity. The units of SoC may be percentage points (0%=empty; 100%=full). An alternative form of the same measure is the depth of discharge (DoD), the inverse of SoC (100%=empty; 0%=full). SoC is normally used when discussing the current state of a battery in use, while DoD may be often seen when discussing the lifetime of the battery after repeated use. In an EVTOL, for example, SoC for the battery module may be the equivalent of a fuel gauge in a gasoline powered vehicle. At least an operational datum 224 may be configured to determine a battery temperature, a stator temperature, an orientation of the eVTOL relative to any suitable reference frame or point, including ground, gravity vector, etc., a position of the eVTOL, a velocity of the eVTOL, and the like. As used in this disclosure, "orientation" describes an attitude and spatial position of the aircraft relative to any suitable reference frame or point. For example, orientation may include, without limitation, data describing attitude, pitch, yaw, and/or roll. Sensor 212 may generate a state of health datum as a function of the operational datum 224 based off of a physical phenomenon 220. For the purposes of this disclosure, "state of health" is a figure of merit of the condition of a battery (or a cell, or a battery pack), compared to its ideal conditions. The units of SoH are percent points (100%=the battery's conditions match the battery's specifications). Typically, a battery's SoH will be 100% at the time of manufacture and will decrease over time and use. However, a battery's performance at the time of manufacture may not meet its specifications, in which case its initial SoH will be less than 100%. Additionally or alternatively, sensor 212 may generate a useful energy remaining datum based off of a physical phenomenon 220. A "useful energy remaining datum," for the purpose of this disclosure, is an operational datum 224 describing a quantity of energy remaining in the battery.

Continuing to refer to FIG. 2, sensor 212 may include a module monitoring unit (MMU). A "module monitoring unit," as used in this disclosure, is a sensing device configured to detect a plurality of inputs and/or phenomenon of the MMU. For instance and without limitation, the MMU may be consistent with the MMU in U.S. patent application Ser. No. 17/529,447 and entitled, "MODULE MONITOR UNIT FOR AN ELECTRIC AIRCRAFT BATTERY PACK AND METHODS OF USE," which is incorporated by reference herein in its entirety. Alternatively or additionally, the sensor 212 may include one or more pack monitor units (PMU). A "pack monitor unit," as used in this disclosure, is a device used to measure the parameters of the plurality of battery modules in a battery pack. For instance and without limitation, the PMU may be consistent with the PMU in U.S. patent application Ser. No. 17/529,583 and entitled, "PACK MONITORING UNIT FOR AN ELECTRIC AIRCRAFT BATTERY PACK AND METHODS OF USE FOR BATTERY MANAGEMENT," filed on Nov. 18, 2021, the entirety of the application is hereby incorporated by reference.

Still referring to FIG. 2, apparatus 200 includes a flight controller (also referred to as "controller") that is communicatively connected to each sensor 212 and/or sensor array. As used herein, "communicatively connected" is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit. For example, and without limitation, each sensor 212 may be communicatively connected to controller. In one or more embodiments, a communicative connection between controller and sensor array may be wireless and/or wired. For example, and without limitation, controller 204 and sensor array may communicate via a controller area network (CAN) communication. In one or more embodiments, the controller may include a computing device (as discussed below), a central processing unit (CPU), a microprocessor, a digital signal processor (DSP), an application specific integrated circuit (ASIC), a control circuit, a combination thereof, or the like. In one or more embodiments, output signals from sensors and/or a controller of apparatus 200 may be analog or digital. The controller may convert output signals from each sensor 212 to a usable form by the destination of those signals. The usable form of output signals from sensors 212 and through the controller may be either digital, analog, a combination thereof, or an otherwise unstated form. Processing by the controller may be configured to trim, offset, or otherwise compensate the outputs of sensors. Based on output of the sensors, the controller may determine the output to send to a downstream component. The controller may include signal amplification, operational amplifier (op-amp), filter, digital/analog conversion, linearization circuit, current-voltage change circuits, resistance change circuits such as a Wheatstone Bridge, an error compensator circuit, a combination thereof, or otherwise undisclosed components.

Continuing to reference FIG. 2, flight controller is configured to receive an operational datum 224 from the sensor 212 and generate an operational switching frequency 228 for the inverter 208 as a function of the operational datum 224. Sensor 212 may be configured to transmit an operational datum 224 by network, such as a mesh network, wireless network. Sensor 212 may be physically connected to the flight controller. As used herein, "switching frequency" is the rate at which a switching device is turned on and off in an inverter 208. A "switching device", as used herein, is used to alternate the direction of DC current in order to produce AC power. A switching device may include semiconductor devices such as transistors and thyristors. An "optimized switching frequency" is a switching frequency that is variable based on operational datum 224. "Optimized", as used herein, refers to a switching frequency that minimizes power losses from the battery/energy source of the aircraft 100 such that the switching frequency optimizes the use of the battery's energy capacity. An operational switching frequency 228 may be determined by a computer-generated algorithm.

Figure 5:
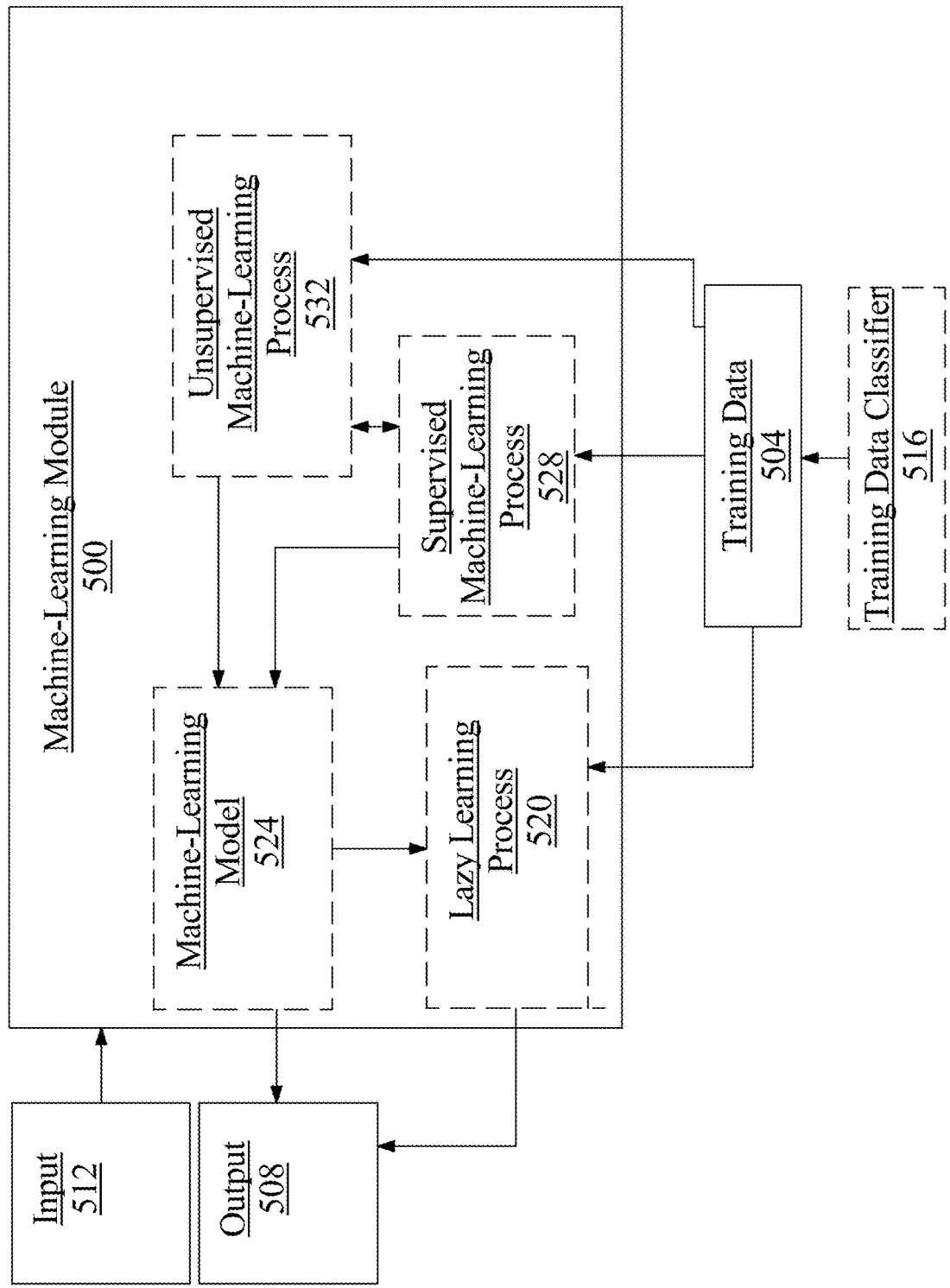
FIG. 5 is a block diagram of a machine-learning module.

Continuing to reference FIG. 2, flight controller may use a machine-learning module (e.g. machine learning module 500 disclosed with reference to FIG. 5) to generate an operational switching frequency 228 for the inverter 208. Process for generating an operational switching frequency 228 may be iterative such that there may be many set of updated training data used to generate an operational switching frequency 228. For example, and without limitation, a machine-learning module 500 and/or process may use a training data set, which includes training data, to generate an algorithm and create a machine-learning model that can determine an operational switching frequency 228 based on the data from the sensor 212. Algorithm may include a mathematical model, a computational fluid dynamics model, a flight model, combinations thereof, and the like. Training data may include inputs and corresponding predetermined outputs so that a machine-learning module 500 may use the correlations between the provided exemplary inputs and outputs to develop an algorithm and/or relationship that then allows the machine-learning module 500 to determine its own outputs for inputs. Training data may contain correlations that a machine-learning process may use to model relationships between two or more categories of data elements. The exemplary inputs and outputs may come from a database 216 or be provided by a user. Database 216 may store information on optimized switching frequencies based on sensor data. For example, database 216 may store a frequency that is efficient in minimizing power loss when a pilot sets the propulsor torque to be 160 lb. ft. In other embodiments, a machine-learning module 500 may obtain a training set by querying a communicatively connected database 216 that includes past inputs and outputs. Past inputs may include sensor data of physical phenomenon 220 and operational datums. Past outputs may include optimized switching frequencies as a function of the past inputs. In an embodiment, optimized switching frequencies may be generated as a function of torque commands received from a pilot and/or flight controller. In another embodiment, operational switching frequency 228 may be generated as a function of weather conditions detected by sensor 212. Any combination of these embodiments along with other sensor data may be used to determine an operational switching frequency 228. Operational switching frequency 228 may vary as a function of the state of health of the energy source 120. Training data may include inputs from various types of sensors and outputs correlated to each of those inputs so that a machine-learning module 500 may determine an operational switching frequency 228. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements.

In one or more embodiments, training data may be filtered, sorted, and/or selected using one or more supervised and/or unsupervised machine-learning processes and/or models, as described in further detail below. Such models may include a training data classifier. A training data classifier may include a mathematical model, neural net, or program generated by a machine learning algorithm that sorts inputs into categories or bins of data and, subsequently, outputs the categories or bins of data and/or labels associated therewith. A classifier may be configured to output at least a datum that labels or otherwise identifies a set of data that are clustered together, found to be close under a distance metric as described below, or the like. For example, and without limitation, an operational datum 224 may be classified and sorted based on the type of sensor that detects the corresponding physical phenomenon 220 and/or based on the unit and/or type of operational datum 224 generated. The classification of operational datum 224 may be used to generate an operational switching frequency 228. In an embodiment, a user and/or machine-learning model, may assign a weight/rating to different classification groups such that one set of sensor data may take higher priority over another when calculating an operational switching frequency 228. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Continuing to reference FIG. 2, flight controller is configured to adjust switching frequency of the inverter 208 based on the operational switching frequency 228. Flight controller may update and implement the operational switching frequency 228 in real time. For example, a pilot may want to change the torque of the propulsor to 160 lb ft. Flight controller may respond by updating the torque of the propulsor and the switching frequency of the inverter 208 to adjust for the change in torque. In another embodiment, pilot and/or flight controller may want to decrease the forward thrust of the aircraft 100 to prepare for landing. Flight controller may respond to the decrease in forward thrust by changing the switching frequency, determined by a machine-learning module 500.

Figure 3:
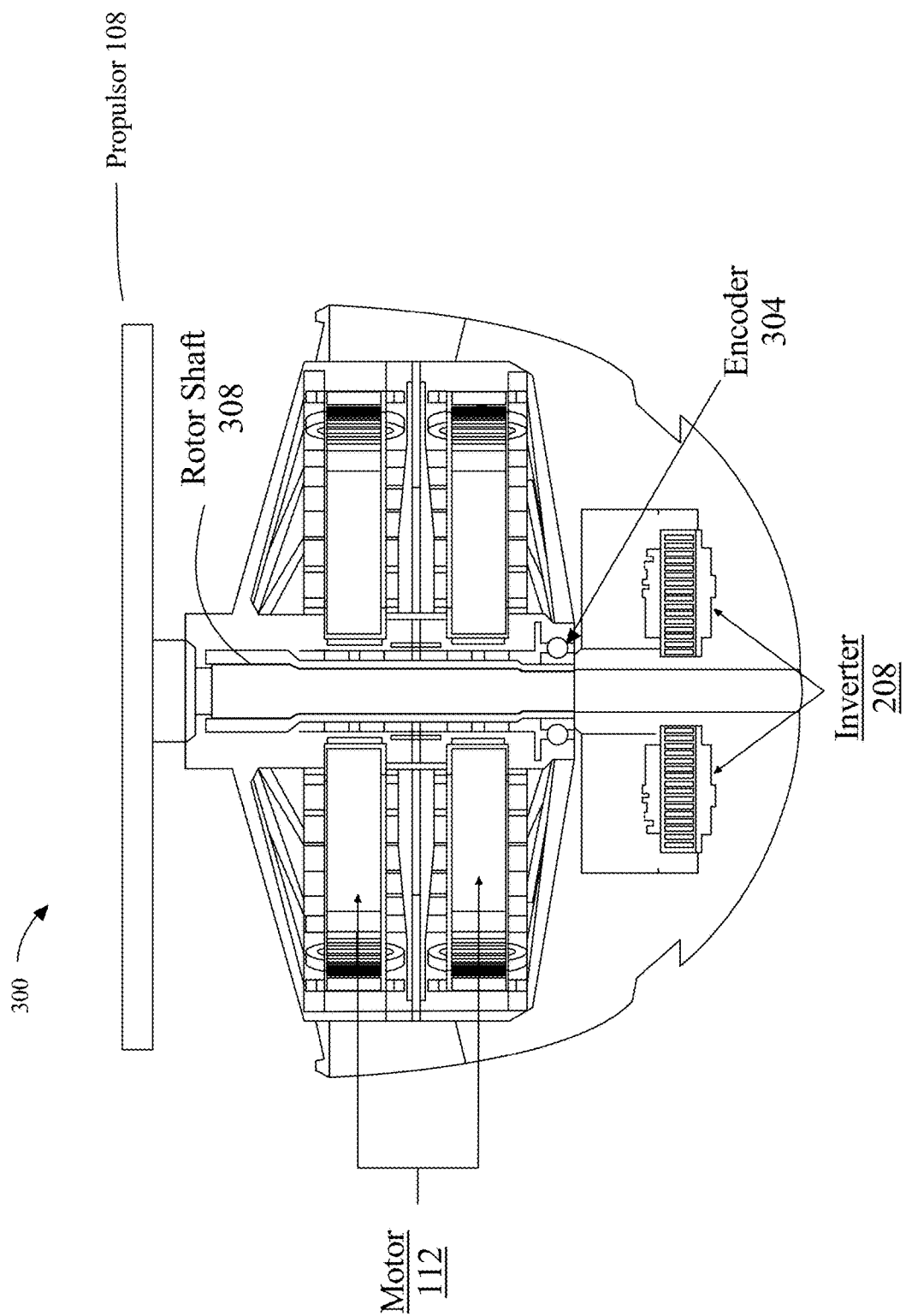
FIG. 3 is a diagram of the cross-sectional view of the motor assembly.

Referring now to FIG. 3, a cross sectional view of an exemplary embodiment of a motor assembly 300. Motor assembly may include a dual motor 112 configuration, wherein the two motors are adjacent to each other and act as a redundant system. Motor assembly 300 may include a stator. "Stator," as used herein, is a stationary component of a motor and/or motor assembly. Motor assembly also may include a propulsor. Motor assembly 300 may include an integrated rotor. As used herein, a rotor is a portion of an electric motor that rotates with respect to a stator of the electric motor, such as stator.

Still referring to FIG. 3, motor assembly 300 may include an encoder 304. Encoder 304 may be consistent with any encoder as discussed in this disclosure. There are two main types of rotary encoders: absolute and incremental. For example, the output of an absolute encoder may indicate the current shaft position, making it an angle transducer. For example, the output of an incremental encoder provides information about the motion of the shaft, which typically is processed elsewhere into information such as position, speed, and distance. Encoder 304 may be used in applications that require monitoring or control, or both, of mechanical systems. Motor assembly 300 may include an inverter 208. Inverter 208 may be consistent with inverters as discussed in this disclosure.

Still referring to FIG. 3, motor assembly 300 may include a drive shaft 308. A "drive shaft," for the purpose of this disclosure, is a rod used to connect a plurality of motors together in an electric motor assembly and/or electric propulsion assembly. In a non-limiting embodiment, drive shaft 308 may include a plurality of segmented shafts that are connected to each other by a coupler. For example and without limitation, a segmented shaft may include short drive shaft located at one end of shaft that protrudes out of one side of motor housing. A "coupler," as used in this disclosure, is a device used to join two shafts for the purpose of transmitting power and/or rotational motion, and may be designed to permit some degree of parallel, axial, or angular misalignment. A drive shaft 308 may be used to drive the propulsor 108. In an embodiment, the rotor may spin the drive shaft 308 which spins the propulsor blades.

Figure 4:
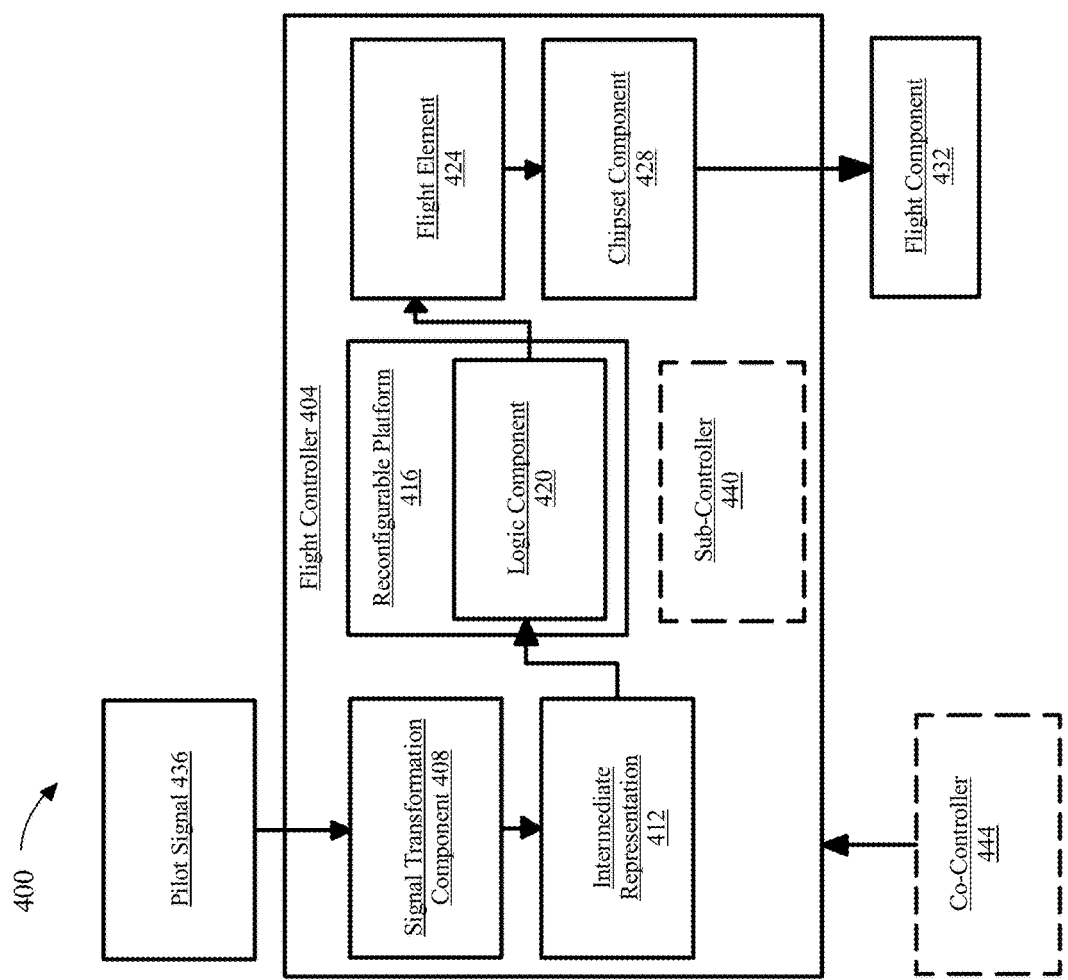
FIG. 4 is a block diagram of an exemplary flight controller.

Now referring to FIG. 4, an exemplary embodiment 400 of a flight controller 404 is illustrated. As used in this disclosure a "flight controller" is a computing device of a plurality of computing devices dedicated to data storage, security, distribution of traffic for load balancing, and flight instruction. Flight controller 404 may include and/or communicate with any computing device as described in this disclosure, including without limitation a microcontroller, microprocessor, digital signal processor (DSP) and/or system on a chip (SoC) as described in this disclosure. Further, flight controller 404 may include a single computing device operating independently, or may include two or more computing device operating in concert, in parallel, sequentially or the like; two or more computing devices may be included together in a single computing device or in two or more computing devices. In embodiments, flight controller 404 may be installed in an aircraft, may control the aircraft remotely, and/or may include an element installed in the aircraft and a remote element in communication therewith.

In an embodiment, and still referring to FIG. 4, flight controller 404 may include a signal transformation component 408. As used in this disclosure a "signal transformation component" is a component that transforms and/or converts a first signal to a second signal, wherein a signal may include one or more digital and/or analog signals. For example, and without limitation, signal transformation component 408 may be configured to perform one or more operations such as preprocessing, lexical analysis, parsing, semantic analysis, and the like thereof. In an embodiment, and without limitation, signal transformation component 408 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 408 may include transforming one or more low-level languages such as, but not limited to, machine languages and/or assembly languages. For example, and without limitation, signal transformation component 408 may include transforming a binary language signal to an assembly language signal. In an embodiment, and without limitation, signal transformation component 408 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 4, signal transformation component 408 may be configured to optimize an intermediate representation 412. As used in this disclosure an "intermediate representation" is a data structure and/or code that represents the input signal. Signal transformation component 408 may optimize intermediate representation as a function of a data-flow analysis, dependence analysis, alias analysis, pointer analysis, escape analysis, and the like thereof. In an embodiment, and without limitation, signal transformation component 408 may optimize intermediate representation 412 as a function of one or more inline expansions, dead code eliminations, constant propagation, loop transformations, and/or automatic parallelization functions. In another embodiment, signal transformation component 408 may optimize intermediate representation as a function of a machine dependent optimization such as a peephole optimization, wherein a peephole optimization may rewrite short sequences of code into more efficient sequences of code. Signal transformation component 408 may optimize intermediate representation to generate an output language, wherein an "output language," as used herein, is the native machine language of flight controller 404. For example, and without limitation, native machine language may include one or more binary and/or numerical languages.

In an embodiment, and without limitation, signal transformation component 408 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 4, flight controller 404 may include a reconfigurable hardware platform 416. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 416 may be reconfigured to enact any algorithm and/or algorithm selection process received from another computing device and/or created using machine-learning processes.

Still referring to FIG. 4, reconfigurable hardware platform 416 may include a logic component 420. As used in this disclosure a "logic component" is a component that executes instructions on output language. For example, and without limitation, logic component may perform basic arithmetic, logic, controlling, input/output operations, and the like thereof. Logic component 420 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 420 may be organized according to Von Neumann and/or Harvard architecture as a non-limiting example. Logic component 420 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 420 may include one or more integrated circuit microprocessors, which may contain one or more central processing units, central processors, and/or main processors, on a single metal-oxide-semiconductor chip. Logic component 420 may be configured to execute a sequence of stored instructions to be performed on the output language and/or intermediate representation 412. Logic component 420 may be configured to fetch and/or retrieve the instruction from a memory cache, wherein a "memory cache," as used in this disclosure, is a stored instruction set on flight controller 404. Logic component 420 may be configured to decode the instruction retrieved from the memory cache to opcodes and/or operands. Logic component 420 may be configured to execute the instruction on intermediate representation 412 and/or output language. For example, and without limitation, logic component 420 may be configured to execute an addition operation on intermediate representation 412 and/or output language.

In an embodiment, and without limitation, logic component 420 may be configured to calculate a flight element 424. As used in this disclosure a "flight element" is an element of datum denoting a relative status of aircraft. For example, and without limitation, flight element 424 may denote one or more torques, thrusts, airspeed velocities, forces, altitudes, groundspeed velocities, directions during flight, directions facing, forces, orientations, and the like thereof. For example, and without limitation, flight element 424 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 424 may denote that aircraft is following a flight path accurately and/or sufficiently.

Still referring to FIG. 4, flight controller 404 may include a chipset component 428. As used in this disclosure a "chipset component" is a component that manages data flow. In an embodiment, and without limitation, chipset component 428 may include a northbridge data flow path, wherein the northbridge dataflow path may manage data flow from logic component 420 to a high-speed device and/or component, such as a RAM, graphics controller, and the like thereof. In another embodiment, and without limitation, chipset component 428 may include a southbridge data flow path, wherein the southbridge dataflow path may manage data flow from logic component 420 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 428 may manage data flow between logic component 420, memory cache, and a flight component 432. As used in this disclosure a "flight component" is a portion of an aircraft that can be moved or adjusted to affect one or more flight elements. For example, flight component 432 may include a component used to affect the aircrafts' roll and pitch which may comprise one or more ailerons. As a further example, flight component 432 may include a rudder to control yaw of an aircraft. In an embodiment, chipset component 428 may be configured to communicate with a plurality of flight components as a function of flight element 424. For example, and without limitation, chipset component 428 may transmit to an aircraft rotor to reduce torque of a first lift propulsor and increase the forward thrust produced by a pusher component to perform a flight maneuver.

In an embodiment, and still referring to FIG. 4, flight controller 404 may be configured generate an autonomous function. As used in this disclosure an "autonomous function" is a mode and/or function of flight controller 404 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 424. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 404 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 404 will control the ailerons and/or rudders. As used in this disclosure "non-autonomous mode" is a mode that denotes a pilot will control aircraft and/or maneuvers of aircraft in its entirety.

In an embodiment, and still referring to FIG. 4, flight controller 404 may generate autonomous function as a function of an autonomous machine-learning model. As used in this disclosure an "autonomous machine-learning model" is a machine-learning model to produce an autonomous function output given flight element 424 and a pilot signal 436 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 436 may denote that a pilot is controlling and/or maneuvering ailerons, wherein the pilot is not in control of the rudders and/or propulsors. In an embodiment, pilot signal 436 may include an implicit signal and/or an explicit signal. For example, and without limitation, pilot signal 436 may include an explicit signal, wherein the pilot explicitly states there is a lack of control and/or desire for autonomous function. As a further non-limiting example, pilot signal 436 may include an explicit signal directing flight controller 404 to control and/or maintain a portion of aircraft, a portion of the flight plan, the entire aircraft, and/or the entire flight plan. As a further non-limiting example, pilot signal 436 may include an implicit signal, wherein flight controller 404 detects a lack of control such as by a malfunction, torque alteration, flight path deviation, and the like thereof. In an embodiment, and without limitation, pilot signal 436 may include one or more explicit signals to reduce torque, and/or one or more implicit signals that torque may be reduced due to reduction of airspeed velocity. In an embodiment, and without limitation, pilot signal 436 may include one or more local and/or global signals. For example, and without limitation, pilot signal 436 may include a local signal that is transmitted by a pilot and/or crew member. As a further non-limiting example, pilot signal 436 may include a global signal that is transmitted by air traffic control and/or one or more remote users that are in communication with the pilot of aircraft. In an embodiment, pilot signal 436 may be received as a function of a tri-state bus and/or multiplexor that denotes an explicit pilot signal should be transmitted prior to any implicit or global pilot signal.

Still referring to FIG. 4, autonomous machine-learning model may include one or more autonomous machine-learning processes such as supervised, unsupervised, or reinforcement machine-learning processes that flight controller 404 and/or a remote device may or may not use in the generation of autonomous function. As used in this disclosure "remote device" is an external device to flight controller 404. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 4, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 404 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 4, flight controller 404 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 404. Remote device and/or FPGA may transmit a signal, bit, datum, or parameter to flight controller 404 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 404 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 4, flight controller 404 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 4, flight controller 404 may include, but is not limited to, for example, a cluster of flight controllers in a first location and a second flight controller or cluster of flight controllers in a second location. Flight controller 404 may include one or more flight controllers dedicated to data storage, security, distribution of traffic for load balancing, and the like. Flight controller 404 may be configured to distribute one or more computing tasks as described below across a plurality of flight controllers, which may operate in parallel, in series, redundantly, or in any other manner used for distribution of tasks or memory between computing devices. For example, and without limitation, flight controller 404 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 4, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 432. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 4, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 404. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 412 and/or output language from logic component 420, wherein output language may include one or more analog-to-digital conversions, low bit rate transmissions, message encryptions, digital signals, binary signals, logic signals, analog signals, and the like thereof described above in detail.

Still referring to FIG. 4, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 4, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 4, flight controller 404 may also be implemented using a "shared nothing" architecture in which data is cached at the worker, in an embodiment, this may enable scalability of aircraft and/or computing device. Flight controller 404 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, a node may include, without limitation a plurality of inputs xi that may receive numerical values from inputs to a neural network containing the node and/or from other nodes. Node may perform a weighted sum of inputs using weights $w_i$ that are multiplied by respective inputs xi. Additionally or alternatively, a bias b may be added to the weighted sum of the inputs such that an offset is added to each unit in the neural network layer that is independent of the input to the layer. The weighted sum may then be input into a function co, which may generate one or more outputs y. Weight $w_i$ applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 4, flight controller may include a sub-controller 440. As used in this disclosure a "sub-controller" is a controller and/or component that is part of a distributed controller as described above; for instance, flight controller 404 may be and/or include a distributed flight controller made up of one or more sub-controllers. For example, and without limitation, sub-controller 440 may include any controllers and/or components thereof that are similar to distributed flight controller and/or flight controller as described above. Sub-controller 440 may include any component of any flight controller as described above. Sub-controller 440 may be implemented in any manner suitable for implementation of a flight controller as described above. As a further non-limiting example, sub-controller 440 may include one or more processors, logic components and/or computing devices capable of receiving, processing, and/or transmitting data across the distributed flight controller as described above. As a further non-limiting example, sub-controller 440 may include a controller that receives a signal from a first flight controller and/or first distributed flight controller component and transmits the signal to a plurality of additional sub-controllers and/or flight components.

Still referring to FIG. 4, flight controller may include a co-controller 444. As used in this disclosure a "co-controller" is a controller and/or component that joins flight controller 404 as components and/or nodes of a distributer flight controller as described above. For example, and without limitation, co-controller 444 may include one or more controllers and/or components that are similar to flight controller 404. As a further non-limiting example, co-controller 444 may include any controller and/or component that joins flight controller 404 to distributer flight controller. As a further non-limiting example, co-controller 444 may include one or more processors, logic components and/or computing devices capable of receiving, processing, and/or transmitting data to and/or from flight controller 404 to distributed flight control system. Co-controller 444 may include any component of any flight controller as described above. Co-controller 444 may be implemented in any manner suitable for implementation of a flight controller as described above.

In an embodiment, and with continued reference to FIG. 4, flight controller 404 may be designed and/or configured to perform any method, method step, or sequence of method steps in any embodiment described in this disclosure, in any order and with any degree of repetition. For instance, flight controller 404 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example flight elements and/or pilot signals may be inputs, wherein an output may be an autonomous function.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to sub-categories of flight elements such as torques, forces, thrusts, directions, and the like thereof.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
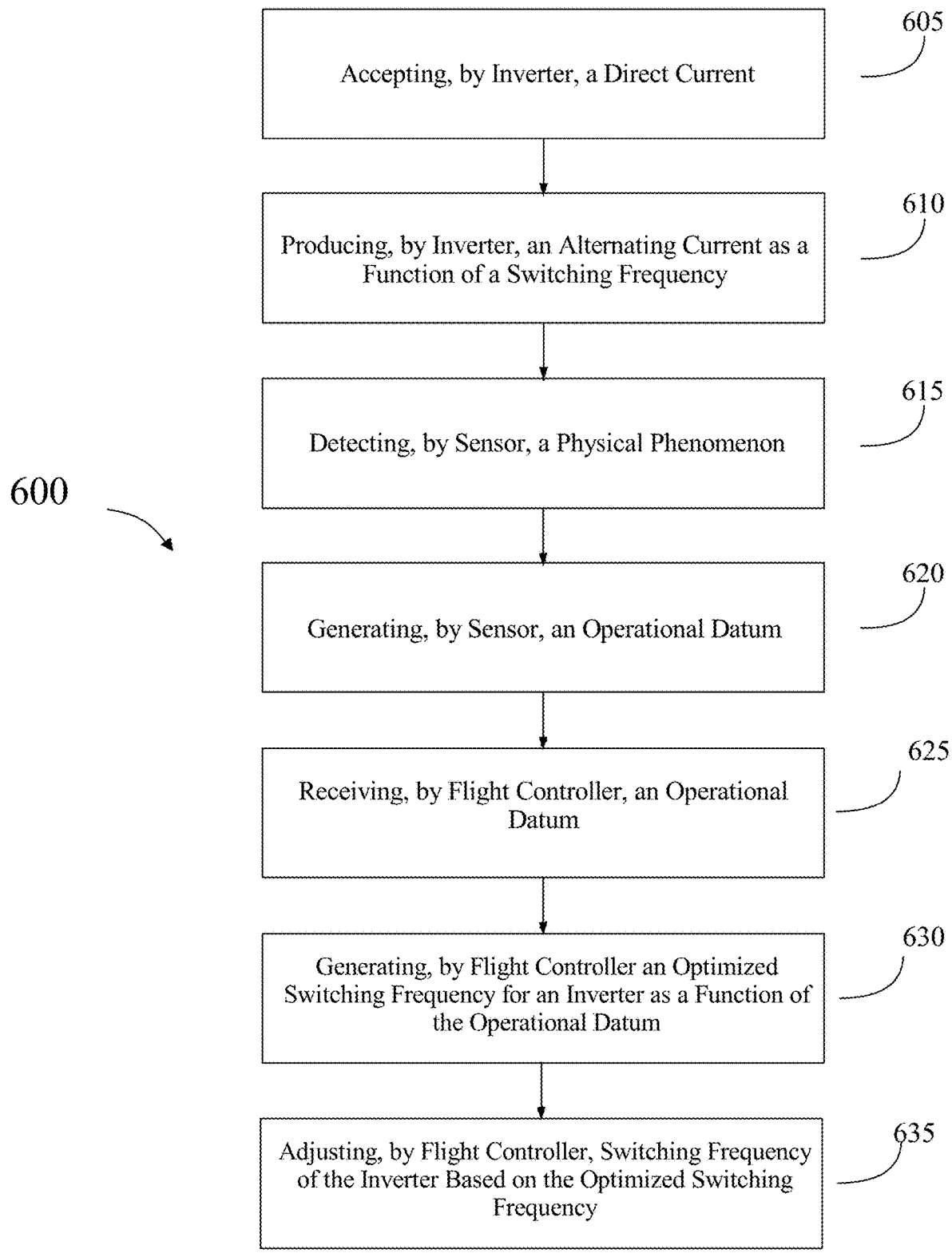
FIG. 6 is a flow diagram of a method for optimizing motor performance.

Now referring to FIG. 6, a method 600 for optimizing motor performance in an electric vertical takeoff and landing aircraft. Motor may be configured to drive a propulsion component of the aircraft. Motor may be configured as a dual motor assembly to add redundancy. Step 605 of method 600 includes accepting, by inverter, a direct current. Direct current may be supplied by an energy source and be consistent with any direct current as discussed herein. Step 610 of method 600 includes producing, by inverter, an alternating current as a function of a switching frequency. Step 615 of method 600 includes detecting, by sensor, a physical phenomenon 220. Physical phenomenon 220 may be any physical phenomenon 220 as discussed in this disclosure. Physical phenomenon may include charge levels of an energy source. Step 620 of method 600 includes generating, by sensor 212, an operational datum 224. Operational datum 224 may be any operational datum 224 as discussed in this disclosure. Operational datum may include a state of charge of an energy source. Operation datum may be a function of a user command such as a torque command. Step 625 of method 600 includes receiving, by flight controller, an operational datum 224. Step 630 of method 600 includes generating, by flight controller, an operational switching frequency 228 for the inverter 208 as a function of the operational datum 224. Operational switching frequency 228 may be generated using any algorithms as discussed in this disclosure, including but not limited to, machine-learning algorithms. Operational frequency may be updated in real time by a controller. The optimized switching frequency may be generated using a machine-learning model that uses previous operational datum as an input and outputs an optimized switching frequency. The machine-learning model may be configured to minimize losses from an energy source of the aircraft. Step 635, of method 600 includes adjusting, by controller, switching frequency of the inverter 208 based on the operational switching frequency 228. Flight controller may use a stored operational switching frequency 228 from a database 216 of optimized switching frequencies stored remotely or on the flight controller. Step 635 may be implemented in any method as discussed in this disclosure.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
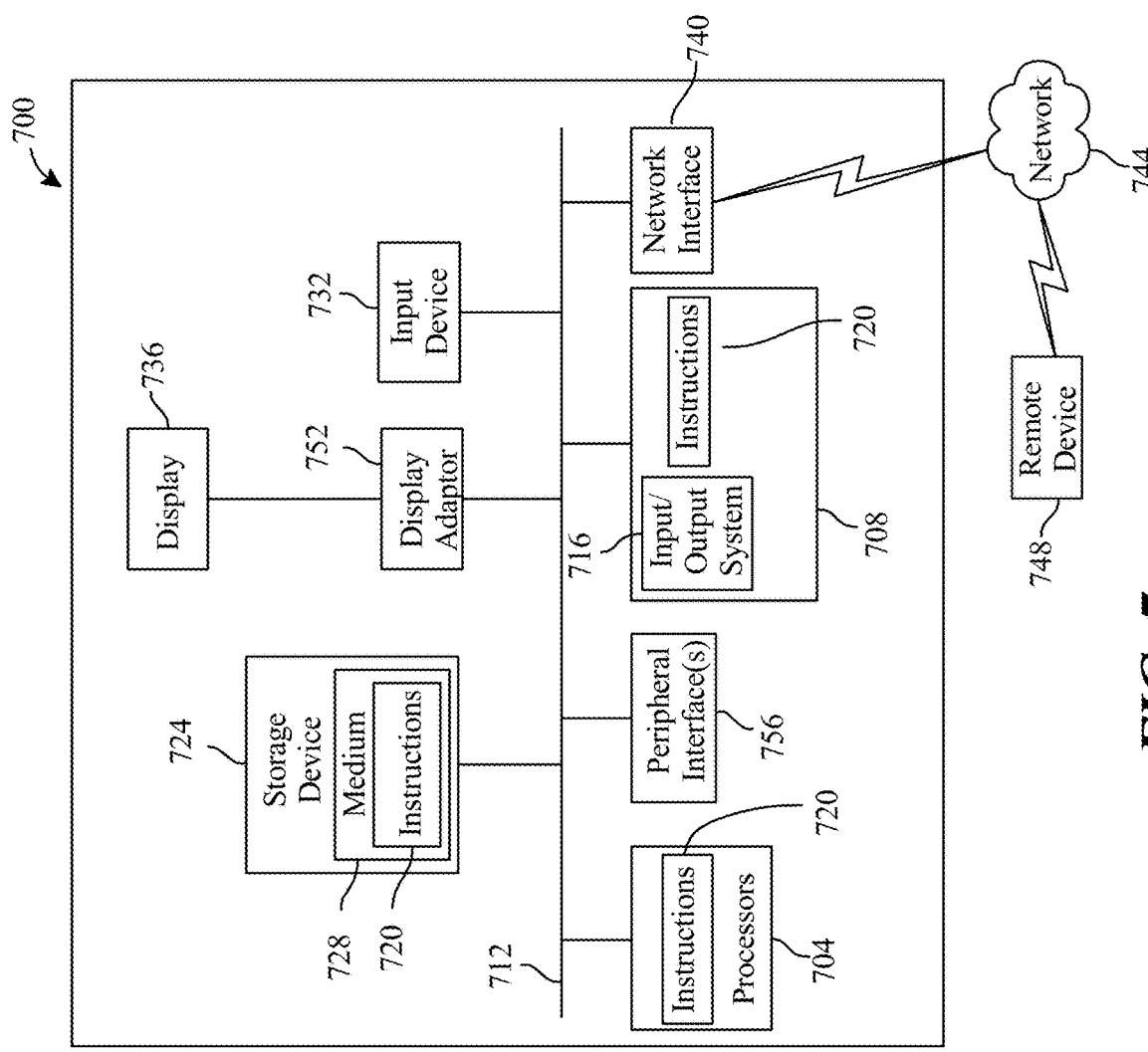
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 7 00 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 7 00 includes a processor 7 04 and a memory 7 08 that communicate with each other, and with other components, via a bus 7 12. Bus 7 12 may include any of several types of bus structures including, but not limited to, a memory bus, a memory controller, a peripheral bus, a local bus, and any combinations thereof, using any of a variety of bus architectures.

Processor 7 04 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 7 04 may be organized according to Von Neumann and/or Harvard architecture as a non-limiting example. Processor 7 04 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 7 08 may include various components (e.g., machine-readable media) including, but not limited to, a random-access memory component, a read only component, and any combinations thereof. In one example, a basic input/output system 7 16 (BIOS), including basic routines that help to transfer information between elements within computer system 7 00, such as during start-up, may be stored in memory 7 08. Memory 7 08 may also include (e.g., stored on one or more machine-readable media) instructions (e.g., software) 7 20 embodying any one or more of the aspects and/or methodologies of the present disclosure. In another example, memory 7 08 may further include any number of program modules including, but not limited to, an operating system, one or more application programs, other program modules, program data, and any combinations thereof.

Computer system 7 00 may also include a storage device 7 24. Examples of a storage device (e.g., storage device 7 24) include, but are not limited to, a hard disk drive, a magnetic disk drive, an optical disc drive in combination with an optical medium, a solid-state memory device, and any combinations thereof. Storage device 7 24 may be connected to bus 7 12 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 7 24 (or one or more components thereof) may be removably interfaced with computer system 7 00 (e.g., via an external port connector (not shown)). Particularly, storage device 7 24 and an associated machine-readable medium 7 28 may provide nonvolatile and/or volatile storage of machine-readable instructions, data structures, program modules, and/or other data for computer system 7 00. In one example, software 7 20 may reside, completely or partially, within machine-readable medium 7 28. In another example, software 7 20 may reside, completely or partially, within processor 7 04.

Computer system 7 00 may also include an input device 7 32. In one example, a user of computer system 7 00 may enter commands and/or other information into computer system 7 00 via input device 7 32. Examples of an input device 7 32 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 7 32 may be interfaced to bus 7 12 via any of a variety of interfaces (not shown) including, but not limited to, a serial interface, a parallel interface, a game port, a USB interface, a FIREWIRE interface, a direct interface to bus 7 12, and any combinations thereof. Input device 7 32 may include a touch screen interface that may be a part of or separate from display 7 36, discussed further below. Input device 7 32 may be utilized as a user selection device for selecting one or more graphical representations in a graphical interface as described above.

A user may also input commands and/or other information to computer system 7 00 via storage device 7 24 (e.g., a removable disk drive, a flash drive, etc.) and/or network interface device 7 40. A network interface device, such as network interface device 7 40, may be utilized for connecting computer system 7 00 to one or more of a variety of networks, such as network 7 44, and one or more remote devices 7 48 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 7 44, may employ a wired and/or a wireless mode of communication. In general, any network topology may be used. Information (e.g., data, software 7 20, etc.) may be communicated to and/or from computer system 7 via network interface device 7 40.

Computer system 7 00 may further include a video display adapter 7 52 for communicating a displayable image to a display device, such as display device 7 36. Examples of a display device include, but are not limited to, a liquid crystal display (LCD), a cathode ray tube (CRT), a plasma display, a light emitting diode (LED) display, and any combinations thereof. Display adapter 7 52 and display device 7 36 may be utilized in combination with processor 7 04 to provide graphical representations of aspects of the present disclosure. In addition to a display device, computer system 7 00 may include one or more other peripheral output devices including, but not limited to, an audio speaker, a printer, and any combinations thereof. Such peripheral output devices may be connected to bus 7 12 via a peripheral interface 7 56. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for optimizing motor performance in an electric aircraft, the apparatus comprising:
   a motor,
   an inverter electronically connected to the motor, wherein the inverter is configured to:
      accept a direct current; and
      produce an alternating current as a function of a switching frequency;
   a sensor configured to detect a state of charge of a battery pack;
   a flight controller; and
   a memory communicatively connected to the flight controller, the memory containing instructions configuring the flight controller to:
      generate an optimized switching frequency for the inverter as a function of the state of charge of the battery pack; and
      adjust the switching frequency of the inverter based on the optimized switching frequency.

2. The apparatus of claim 1, wherein the motor is configured to drive a propulsion component of the electric aircraft.

3. The apparatus of claim 1, wherein a weight is assigned to the state of charge of the battery pack.

4. The apparatus of claim 3, wherein the weight indicates a priority based on a classification of sensor data.

5. The apparatus of claim 3, wherein the weight is assigned using a machine-learning model.

6. The apparatus of claim 1, wherein the flight controller is configured to update and implement the optimized switching frequency in real time.

7. The apparatus of claim 1, wherein the optimized switching frequency is generated using a machine-learning model that uses previous operational data as an input and outputs the optimized switching frequency.

8. The apparatus of claim 7, wherein the machine-learning model is configured to minimize losses from an energy source of the electric aircraft.

9. The apparatus of claim 1, wherein the motor includes a dual motor assembly configured to add redundancy.

10. The apparatus of claim 1, further comprising a database to store optimized switching frequencies to be used as inputs to a machine-learning model.

11. A method for optimizing performance of a motor in an electric aircraft, the method comprising:
    accepting, by an inverter, a direct current;
    producing, by the inverter, an alternating current as a function of a switching frequency;
    detecting, by a sensor, a state of charge of a battery pack;
       generating, by a controller, an optimized switching frequency for the inverter as a function of the state of charge of the battery pack; and
    adjusting, by the controller, the switching frequency of the inverter based on the optimized switching frequency.

12. The method of claim 11, wherein the motor is configured to drive a propulsion component of the electric aircraft.

13. The method of claim 11, further comprising assigning a weight to the state of charge of the battery pack.

14. The method of claim 13, wherein assigning the weight indicates a priority based on a classification of sensor data.

15. The method of claim 13, wherein assigning the weight is performed by a machine-learning model.

16. The method of claim 11, wherein the controller is configured to update and implement the optimized switching frequency in real time.

17. The method of claim 11, wherein the optimized switching frequency is generated using a machine-learning model that uses previous operational data as an input and outputs the optimized switching frequency.

18. The method of claim 17, wherein the machine-learning model is configured to minimize losses from an energy source of the electric aircraft.

19. The method of claim 11, wherein the motor includes a dual motor assembly configured to add redundancy.

20. The method of claim 11, further comprising a database to store optimized switching frequencies to be used as inputs to a machine-learning model.

* * * * *